(12) United States Patent
Hartman et al.

(10) Patent No.: US 12,103,073 B2
(45) Date of Patent: Oct. 1, 2024

(54) THREE-DIMENSIONAL OBJECT FORMATION

(71) Applicant: Hewlett-Packard Development Company, L.P., Spring, TX (US)

(72) Inventors: Aja Hartman, Palo Alto, CA (US); John Samuel Dilip Jangam, Palo Alto, CA (US); Lihua Zhao, Palo Alto, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 17/311,421

(22) PCT Filed: Oct. 11, 2019

(86) PCT No.: PCT/US2019/055802
§ 371 (c)(1),
(2) Date: Jun. 7, 2021

(87) PCT Pub. No.: WO2020/190335
PCT Pub. Date: Sep. 24, 2020

(65) Prior Publication Data
US 2022/0226892 A1    Jul. 21, 2022

Related U.S. Application Data

(63) Continuation-in-part of application No. PCT/US2019/022728, filed on Mar. 18, 2019, which
(Continued)

(51) Int. Cl.
*B22F 10/14* (2021.01)
*B22F 1/00* (2022.01)
(Continued)

(52) U.S. Cl.
CPC ............... *B22F 10/14* (2021.01); *B22F 1/09* (2022.01); *B22F 1/105* (2022.01); *B22F 3/1017* (2013.01);
(Continued)

(58) Field of Classification Search
CPC .. B22F 10/14; B22F 1/09; B22F 1/105; B22F 3/1017; B22F 1/10; B22F 2201/013;
(Continued)

(56) References Cited

U.S. PATENT DOCUMENTS

| 5,419,860 A | 5/1995 | Menchhofer |
| 6,849,230 B1 | 2/2005 | Feichtinger |

(Continued)

FOREIGN PATENT DOCUMENTS

| CN | 1382540 A | 12/2002 |
| CN | 101010161 A | 8/2007 |

(Continued)

OTHER PUBLICATIONS

Bai et al. ("Binder jetting additive manufacturing with a particle-free metal ink as a binder precursor." Materials & Design 147 (2018): 146-156.) (Year: 2018).*
(Continued)

*Primary Examiner* — Sally A Merkling
*Assistant Examiner* — Ricardo D Morales
(74) *Attorney, Agent, or Firm* — HP Inc. Patent Department

(57) ABSTRACT

A kit for three-dimensional printing a metal object is described. The kit comprises a build material and a shaping composition. The build material comprises metallic particles. The shaping composition comprises a metallic mixture for forming an intermetallic compound with the metallic particles and/or that is exothermically reactive.

11 Claims, 3 Drawing Sheets

Related U.S. Application Data is a continuation-in-part of application No. PCT/US2019/022710, filed on Mar. 18, 2019.

(51) Int. Cl.
  *B22F 1/10*    (2022.01)
  *B22F 1/105*   (2022.01)
  *B22F 3/10*    (2006.01)
  *B33Y 10/00*   (2015.01)
  *B33Y 70/00*   (2020.01)

(52) U.S. Cl.
  CPC ........... *B22F 1/10* (2022.01); *B22F 2201/013* (2013.01); *B22F 2207/20* (2013.01); *B22F 2999/00* (2013.01); *B33Y 10/00* (2014.12); *B33Y 70/00* (2014.12)

(58) Field of Classification Search
  CPC .. B22F 2207/20; B22F 2999/00; B33Y 10/00; B33Y 70/00
  See application file for complete search history.

(56) References Cited

U.S. PATENT DOCUMENTS

| | | |
|---|---|---|
| 8,961,840 B1 | 2/2015 | Hill et al. |
| 9,399,256 B2 | 7/2016 | Buller et al. |
| 9,427,941 B2 | 8/2016 | Feinstein |
| 9,833,839 B2 | 12/2017 | Gibson et al. |
| 10,040,216 B2 | 8/2018 | Bai et al. |
| 10,087,332 B2 | 10/2018 | Connor et al. |
| 2001/0050031 A1 | 12/2001 | Bredt et al. |
| 2002/0189405 A1 | 12/2002 | Liu et al. |
| 2009/0018009 A1 | 1/2009 | Zambaldo |
| 2009/0126833 A1 | 5/2009 | Cavanaugh et al. |
| 2009/0233118 A1 | 9/2009 | Katoh et al. |
| 2010/0183471 A1 | 7/2010 | Liu et al. |
| 2012/0009340 A1 | 1/2012 | Sepeur et al. |
| 2013/0004664 A1 | 1/2013 | Agrawal et al. |
| 2014/0087210 A1 | 3/2014 | Keane et al. |
| 2014/0342083 A1 | 11/2014 | Wu et al. |
| 2015/0158244 A1* | 6/2015 | Tibbits ............... B29C 61/04 |
| | | 264/479 |
| 2015/0176115 A1 | 6/2015 | Lin et al. |
| 2016/0271877 A1 | 9/2016 | Suzuki et al. |
| 2016/0288206 A1 | 10/2016 | Ohtaki et al. |
| 2016/0339517 A1 | 11/2016 | Joshi et al. |
| 2017/0029929 A1 | 2/2017 | Konyashin et al. |
| 2017/0159459 A1 | 6/2017 | Courcot et al. |
| 2017/0175834 A1 | 6/2017 | Bracamonte et al. |
| 2018/0117845 A1 | 5/2018 | Buller et al. |
| 2018/0193913 A1 | 7/2018 | Iwai et al. |
| 2018/0194992 A1 | 7/2018 | Aou et al. |
| 2018/0207749 A1* | 7/2018 | Wasynczuk ............ B23K 26/34 |
| 2018/0298215 A1 | 10/2018 | Andersen et al. |
| 2018/0304363 A1 | 10/2018 | Myerberg et al. |
| 2018/0305266 A1 | 10/2018 | Gibson et al. |
| 2018/0305863 A1 | 10/2018 | Dimotakis et al. |
| 2018/0326480 A1 | 11/2018 | Opschoor et al. |
| 2018/0369909 A1 | 12/2018 | Ibe et al. |
| 2019/0003019 A1 | 1/2019 | Ibe et al. |
| 2019/0016904 A1 | 1/2019 | Connor et al. |
| 2019/0047045 A1 | 2/2019 | Shaarawi et al. |
| 2019/0161837 A1 | 5/2019 | Maderud et al. |
| 2019/0308241 A1 | 10/2019 | Lundin et al. |
| 2020/0254519 A1* | 8/2020 | Jones ............... B29C 64/393 |
| 2020/0406351 A1 | 12/2020 | Kasperchik et al. |
| 2021/0086266 A1* | 3/2021 | Black ............... B33Y 70/10 |
| 2021/0163364 A1 | 6/2021 | Hou et al. |
| 2021/0283686 A1 | 9/2021 | Olubummo et al. |
| 2021/0402467 A1 | 12/2021 | Jangam et al. |

FOREIGN PATENT DOCUMENTS

| | | |
|---|---|---|
| CN | 101068503 A | 11/2007 |
| CN | 101365558 A | 2/2009 |
| CN | 101384519 A | 3/2009 |
| CN | 101435066 A | 5/2009 |
| CN | 101489704 A | 7/2009 |
| CN | 101594954 A | 12/2009 |
| CN | 102395707 A | 3/2012 |
| CN | 102579142 A | 7/2012 |
| CN | 102649330 A | 8/2012 |
| CN | 103608314 A | 2/2014 |
| CN | 103702811 A | 4/2014 |
| CN | 103718254 A | 4/2014 |
| CN | 203619302 U | 6/2014 |
| CN | 104116578 A | 10/2014 |
| CN | 104625071 A | 5/2015 |
| CN | 104722752 A | 6/2015 |
| CN | 104888616 A | 9/2015 |
| CN | 105142825 A | 12/2015 |
| CN | 105268977 A | 1/2016 |
| CN | 105364065 A | 3/2016 |
| CN | 105399966 A | 3/2016 |
| CN | 105451916 A | 3/2016 |
| CN | 105642885 A | 6/2016 |
| CN | 105665706 A | 6/2016 |
| CN | 106738875 A | 5/2017 |
| CN | 107001162 A | 8/2017 |
| CN | 107073825 A | 8/2017 |
| CN | 107075687 A | 8/2017 |
| CN | 107848029 A | 3/2018 |
| CN | 107921533 A | 4/2018 |
| CN | 107922828 A | 4/2018 |
| CN | 108188396 A | 6/2018 |
| CN | 108430765 A | 8/2018 |
| CN | 108503355 A | 9/2018 |
| CN | 108602118 A | 9/2018 |
| CN | 108602264 A | 9/2018 |
| CN | 109153036 A | 1/2019 |
| CN | 109261958 A | 1/2019 |
| CN | 109311091 A | 2/2019 |
| CN | 109451732 A | 3/2019 |
| CN | 109730803 A | 5/2019 |
| CN | 110177636 A | 8/2019 |
| EP | 1224989 A2 | 7/2002 |
| IN | 104894554 A | 9/2015 |
| KR | 10-1749212 B1 | 6/2017 |
| KR | 10-1885474 B1 | 8/2018 |
| TW | 461839 B | 11/2001 |
| TW | 201327581 A | 7/2013 |
| TW | 201427924 A | 7/2014 |
| TW | M483189 U | 8/2014 |
| TW | 201829154 A | 8/2018 |
| WO | 2006/079459 A1 | 8/2006 |
| WO | 2012/156905 A1 | 11/2012 |
| WO | 2013/020946 A1 | 2/2013 |
| WO | 2016/140888 A1 | 9/2016 |
| WO | 2016/187624 A2 | 11/2016 |
| WO | 2017/181054 A1 | 10/2017 |
| WO | WO-2017183893 A2 | 10/2017 |
| WO | 2018/017369 A2 | 1/2018 |
| WO | 2018/156933 A1 | 8/2018 |
| WO | 2018/200515 A1 | 11/2018 |
| WO | 2019/025801 A1 | 2/2019 |
| WO | 2019/027420 A1 | 2/2019 |
| WO | 2019/156675 A1 | 8/2019 |
| WO | 2019/177614 A1 | 9/2019 |

OTHER PUBLICATIONS

Caputo, Matthew, "4-Dimensional Printing and Characterization of Net-Shaped Porous Parts Made from Magnetic Ni—Mn—Ga Shape Memory Alloy Powders", Youngstown State Univ, May 2018.

Liu, Guo et al., "Origami and 4D printing of elastomer-derived ceramic structures," Science Advances, Aug. 17, 2018, 1-10.

Liu, Chang-Hua, et al. "Microstructure and permeability of Ni/Al2O3 cermet coating for SOFC supporter," vol. 33, No. 12, Dec. 2009, pp. 1075-1085.

(56) References Cited

OTHER PUBLICATIONS

Possart, W. "Curing of Polymer Adhesives on Metals: Adhesion-Interphase-Properties," Proceedings of 2010 Beijing International Bonding Technology Symposium, Nov. 30, 2010, pp. 1-30.

* cited by examiner

THREE-DIMENSIONAL OBJECT FORMATION

BACKGROUND

Three-dimensional (3D) printing may bean additive printing process used to make three-dimensional solid parts from a digital model. Three-dimensional printing is often used in rapid product prototyping, mold generation, mold master generation, and short run manufacturing. Some 3D printing techniques are considered additive processes because they involve the application of successive layers of material. This is unlike other machining processes, which often rely upon the removal of material to create the final part. Some 3D printing methods use chemical binders or adhesives to bind build materials together. Other 3D printing methods involve partial sintering, melting, etc. of the build material.

BRIEF DESCRIPTION OF THE DRAWINGS

The figures depict several examples of the present disclosure. It should be understood that the present disclosure is not limited to the examples depicted in the figures.

DETAILED DESCRIPTION

Figure 1:
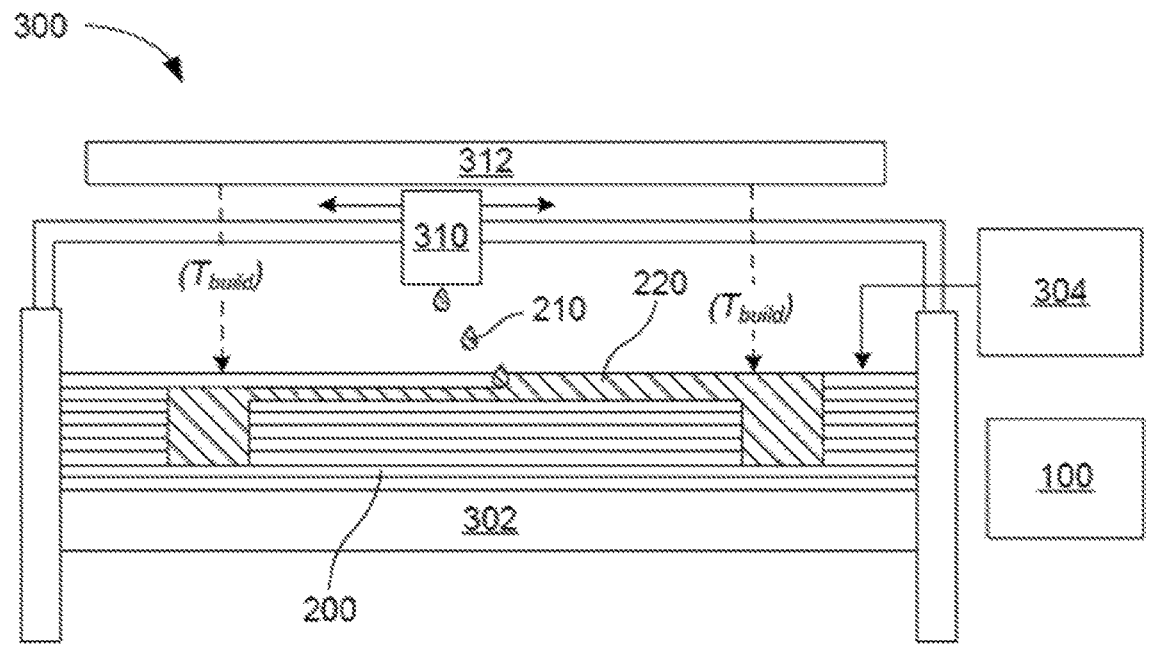
FIG. 1 illustrates an example of a three-dimensional printing kit associated with an additive manufacturing three-dimensional printer in accordance with the present disclosure.

Three-dimensional (3D) printing can be an additive process that can involve the application of successive layers of particulate build material with chemical binders or adhesives printed thereon to bind the successive layers of the particulate build material together. In some processes, application of binder can be utilized to form a green body and then a fused three-dimensional physical object can be formed therefrom. More specifically, binder fluid can be selectively applied to a layer of a particulate build material on a support bed to pattern a selected region of the layer and then another layer of the particulate build material is applied thereon. The binder fluid can be applied to another layer of the particulate build material and these processes can be repeated to form a green body. The green body can sintered or otherwise heat-fused to form a form a fused metal object.

3D printing can be used to manufacture a series of parts and to then assemble these parts into a final object. However, directly forming a complex assembled structure using 3D printing can be difficult. It may be necessary to incorporate spacers or supports at locations for forming these structures, particularly where there is a danger that they will collapse or sag. The spacers or supports then have to be removed during post-processing. Difficulties associated with the formation of complex, assembled structures may be exacerbated if the binder is ineffective, such as when the binder burns off (e.g. polymeric binder) at the temperatures used for sintering or where the binder is not effective prior to fusing of the green body to form a fused metal object. This can lead to sagging, which may prevent the formation of complex, assembled structures.

After 3D printing the green body and prior to fusing, there is an opportunity for additional shaping of the green body to direct the formation of the fused metal object that is ultimately produced. This can allow objects made through a 3D printing process, which might otherwise have required assembly or other post-processing of printed parts, to be rapidly manufactured and assembled without requiring post-printing assembly. A metal object can be printed as a green body in a first shape and transformed to a predetermined shape prior to heat-fusing the green body. This transforming the green body in a first shape into a predetermined shape can be utilised to bring about self-assembly of the final metal object.

The present disclosure refers herein to a shaping composition, a kit, a coated green body object, a 3D printing system and their uses, as well as a method of forming a metal object. In accordance with the present disclosure, shaping compositions can be applied to green bodies at predetermined locations, coating thicknesses, and/or compositional make-ups to bring about self-assembly to form complex structures, even when support structures may not be present.

The present disclosure refers herein to kit for three-dimensional printing a metal object. The kit comprises a build material and a shaping composition. The build material comprises metallic particles. The shaping composition comprises a metallic mixture. The metallic mixture is for forming an intermetallic compound with the metallic particles and/or the metallic mixture can be an exothermic mixture.

The present disclosure also refers herein to a coated green body. The coated green body may be used to prepare a metal object having an assembled part. The coated green body comprises a build material and a coating of a shaping composition. The build material includes metallic particles. The shaping composition comprises a metallic mixture. The metallic mixture is for forming an intermetallic compound with the metallic particles and/or the metallic mixture can be an exothermic mixture. The coating of the shaping composition is on a surface of the green body at a region for forming the assembled part of the metal object. The coated green body has an initial shape to self-assemble into a predetermined shape, which may be the shape of the metal object.

The present disclosure further refers herein to a method of forming a metal object having an assembled part. A shaping composition is selectively applied onto a surface of a green body at a region for forming the assembled part to produce a coated green body. The green body comprises a build material, which includes metallic particles, and the shaping composition comprises a metallic mixture. The metallic mixture is for forming an intermetallic compound with the metallic particles and/or the metallic mixture can be an exothermic mixture. The shaping composition is heated to react the metallic mixture to form the assembled part.

In general, the metal object having an assembled part provided by the present disclosure may not require assembly after fusing.

Generally, the shaping composition is not, for example, used to prevent or control deformation of a green body during fusing, such as heat-fusing.

It is to be understood that this disclosure is not limited to the kit, the coated green body or the method of forming a metal object disclosed herein. It is also to be understood that the terminology used in this disclosure is used for describing particular examples.

Shaping Compositions

The shaping composition is used to form an assembled part of a metal object. The shaping composition is used to control the transformation, such as by deformation, of a green body at a region for forming the assembled part during fusing, such as heat-fusing. The transformation can be the curling, folding, stretching, or shrinking of the region for forming the assembled part.

In one example, the shaping composition is used to cause expansion of a surface of the green body at the region for forming the assembled part.

The shaping composition can also be used, for example, to control the transformation, such as by deformation, of a metal injection molded object to form an assembled part.

Metal injection molding involves injecting a build material into a mold, such as by using a plastic injection molding machine. The build material comprises metallic particles and a binder, such as described herein. The shaped material that is ejected from the mold is a green body as described herein. Thus, any reference to a "green body" herein is equally applicable to a metal injection molded object in appropriate contexts. In a metal injection molding process, the green body is then heated to fuse the green body, such as by sintering, to produce a metal object.

The shaping composition comprises a metallic mixture. The shaping composition may further include a binder or a liquid vehicle or a binder and a liquid vehicle.

As used herein, the term "metallic mixture" in the context of a shaping composition is synonymous with the term "metallic shaping mixture".

The metallic mixture of the shaping composition is used to form an intermetallic compound with the metallic particles of the build material and/or the metallic mixture can be exothermically reactive.

The metallic mixture comprises a metal that can form an intermetallic compound with a metal of the metallic particles of the build material. The intermetallic compound can be an intermetallic alloy, such as an ordered intermetallic alloy. An ordered intermetallic alloy has a defined stoichiometry and an ordered crystal structure.

In general, the metallic mixture can form an intermetallic compound with a metal of the metallic particles of the build material at temperature that is below the fusing temperature (e.g. the fusing temperature of the green body). Thus, the intermetallic compound is formed at a lower temperature than the temperature at which the metallic particles of the build material fuse. The intermetallic compound may be a high temperature material (e.g. the melting point of the intermetallic compound is higher than the fusing temperature of the build material).

The formation of an intermetallic compound at a surface of the green body brings about a change in shape. As the reaction proceeds between the metallic mixture of the shaping composition and the metallic particles of the build material, the resulting intermetallic compound forms large particles that grow in size until the reaction is complete. These particles cause deformation of the green body thereby bringing about a change in shape of the regions to which the shaping composition has been applied. The particles of the intermetallic compound also hold together the surrounding region of the green body.

The intermetallic compound may be formed by an exothermic reaction or an endothermic reaction.

In one example, the intermetallic compound is formed by an exothermic reaction. The heat generated by this exothermic reaction may also deform the region of the green body to which the shaping composition has been applied.

The shaping composition can be heated to react the metallic mixture. The shaping composition may be exothermically reactive.

The term "exothermically reactive" as used in this context refers to a mixture of, at least, a first metal and a second metal, where the first metal and the second metal react to produce heat. The metallic mixture can comprise the first metal. The metallic particles of the build material or the metallic mixture may comprise the second metal. The heat is produced at a temperature sufficient to cause deformation of a green body at a region coated with the metallic mixture. This temperature at which deformation occurs will depend on the composition of the green body. Generally, the temperature sufficient to cause deformation of the green body at the region coated with the metallic mixture is at least 500° C., such as at 600° C. For the avoidance of doubt, the first metal and the second metal are different.

The metallic mixture may adhere or bond to a surface of the green body.

The metallic mixture may comprise at least one metal to form an intermetallic alloy with the metallic particles of the build material. The intermetallic alloy may be formed with the metallic particles of the build material at a surface of the green body. The intermetallic alloy may form a surface layer on the green body during sintering. This surface layer of the intermetallic alloy may be removable after sintering to form a metal object. The surface layer of the intermetallic alloy can be very thin, so that it does not have a significant effect on the shape or dimensions of the metal object.

The intermetallic alloy between at least one metal of the metallic mixture and the metallic particles of the build material may, for example, form at a temperature lower than the temperature at which metallic mixture undergoes an exothermic reaction.

The shaping composition may be removable from a surface of the metal object after sintering. Thus, the shaping composition, particularly the metallic mixture, does not form a permanent bond to a surface of the metal object. The shaping composition may be easily removable from the metal object.

The metallic mixture can be a metal particulate mixture.

The metallic mixture can include (a) aluminum particulates or aluminum alloy particulates and (b) secondary metal particulates or second metal alloy particulates. The secondary metal particulates or the second metal alloy particulates may be reactive with the aluminum or aluminum alloy particulates upon application of heat.

The shaping composition may include from about 30 wt % to about 90 wt % of the metallic mixture (e.g. based on a total weight of the shaping composition).

The metallic mixture can include from 10 wt % to 60 wt % aluminum, from 20 wt % to 50 wt % aluminum, or from 25 wt % to 45 wt % aluminum. These amounts are based on the total elemental aluminum content and the weight of the metallic mixture. These weight percentages can be reduced if based on the total weight of the shaping composition, which can include liquid vehicle, binder, and/or other components used to form the slurry and act to bind the shaping composition together.

The secondary metal can be present in the metallic mixture at from 10 wt % to 60 wt %, from 20 wt % to 50 wt %, or from 25 wt % to 45 wt %. These amounts are based on the total elemental secondary metal content and the weight of the metallic mixture.

Generally, the aluminum or aluminum alloy particulates and the secondary metal or metal alloy particulates do not undergo a reaction with one another and/or they are thermally stable in the shaping composition up to a temperature from about 250° C. to about 750° C., such as about 250° C. to about 500° C. The aluminum or aluminum alloy particulates and the secondary metal or metal alloy particulates do not undergo a reaction and/or can be thermally stable in the shaping composition to a temperature up to about 600° C., up to about 700° C.

The aluminum or aluminum alloy particulates and the secondary metal or metal alloy particulates are, for example, exothermically reactive at a temperature from about 500° C. to about 1,000° C. In one example, the aluminum or aluminum alloy particulates and the secondary metal or metal alloy particulates are exothermically reactive at a temperature from about 600° C. to about 1,000° C. or from about 700° C. to about 1000° C.

Higher concentrations of aluminum can lead to increased curvature, particularly with copper-containing metal build particles. Without being bound to any particular theory, this may be related to the diffusion of the aluminum into the copper particles, and the interaction with the secondary metal or alloy and the copper-containing build particles. Forming an alloy between aluminum (from the metallic mixture) and copper (from the green body) at just the surface or slightly there beneath can lead to deformation of the green body, e.g. inducing shapes to form an assembled part. With these properties, when the composition of the correct formulation, thickness, or the like is applied at an appropriate location, the metallic mixture in the shaping composition, applied as a coating to a surface of the green body, can provide a reactive or alloying interaction with the surface to provide a chemical, an alloying, and/or an exothermic reaction to the surface to bring about shaping.

The metallic mixture can have an aluminum elemental content to the secondary metal elemental content atomic ratio of about 1:2 to about 2:1.

The aluminum particulates can be elemental aluminum particulates.

The aluminum alloy particulates can be aluminum-silicon alloy, aluminum-manganese alloy, aluminum-magnesium alloy, aluminum-silicon-magnesium alloy, aluminum-zinc alloy, aluminum-zinc-magnesium, and/or aluminum-copper alloy particulates. In one example, the aluminum alloy particulates are aluminum-silicon or aluminum-silicon-magnesium alloy particulates.

The secondary metal particulates can be an elemental metal or the secondary metal alloy particulates can be a metal alloy. The elemental metal or the metal alloy can be exothermically reactive with aluminum when exposed to heat.

The secondary metal particulates or the secondary metal alloy particulates can, for example, can include iron, copper, nickel, titanium, zinc, and/or tin. The secondary metal alloy can be steel, stainless steel, cast iron, an alloy of iron and nickel, an alloy of iron and chrome, or an alloy of copper, such as bronze, brass or other copper alloys (e.g. a copper alloy comprising from 50 wt % up to less than 100 wt % of copper).

In one example, the secondary metal particulates are iron particulates, such as elemental iron particulates, or the secondary metal alloy particulates are iron-containing particulates. The iron-containing particulates can be stainless steel particulates.

In one specific example, the metallic mixture includes aluminum and iron at an elemental ratio of about 1:2 to about 2:1, from about 4:5 to about 5:4, from about 4:3 to about 3:2, or from about 2:3 to about 3:2, for example. The aluminum and iron can be provided in the form of elemental metals and/or alloys, where the aluminum and iron content is present in the aforementioned ratios.

The secondary metal particulates or the secondary metal alloy particulates may not include aluminum.

Generally, the aluminium or aluminium alloy particulates may have a D50 particle size from about 1 μm to about 100 μm.

The secondary metal particulates or the secondary metal alloy particulates may have a D50 particle size from about 1 μm to about 100 μm.

The aluminum or aluminum alloy particulates and/or the secondary metal or metal alloy particulates can, for example, each independently have a D50 particle size from about from about 1 μm to about 100 μm, from about 2 μm to about 75 μm, or from about from about 5 μm to about 50 μm.

Aluminum works well as one of the two metals of the metallic mixture because it can exothermically react with multiple secondary metals. In some instances, it can diffuse or be infused with the metallic particles of the build material to form the green body. Using copper as the metallic particles of the build material as an example, aluminum can melt at a relatively low temperature, and a portion of the aluminum can diffuse into the copper particles. Another portion can remain to react with the secondary metal or metal alloy, such as an iron-based metal or alloy, e.g., stainless steel.

In general, the shaping composition can be a coating, such as in the form of a viscous slurry.

The shaping composition can be self-supporting and/or self-adhesive to a green body. In some instances, the shaping composition can be self-adhesive to a green body when oriented in any direction. Thus, the shaping composition adheres to a surface of the green body. It is able to counteract or hold on to a surface of the green body with gravitational pull working against the shaping composition location relative to a surface of the green body.

In one example, the shaping composition does not comprise a binder.

In another example, the shaping composition further comprises a binder.

The term "binder" or "binder compound" as used herein includes any material that is used to physically bind together the metallic mixture, such as the metal particulate mixture. The binder may be used to bind together the initial metallic mixture. The binder may also bind together the metallic mixture for a period of time during heating in a fusing oven or furnace.

The shaping composition may include a binder in an amount from about 3 wt % to about 50 wt %, from about 10 wt % to about 50 wt %, from about 20 wt % to about 50 wt %, from 20 about 5 wt % to about 20 wt %, or from about 10 wt % to about 30 wt %.

The binder can be co-dispersed with the metallic mixture. The binder may also form part of the slurry, when the shaping composition is in the form of a slurry.

When the shaping composition comprises a binder, the binder may be a metal compound, such as a reducible metal compound, or a polymeric binder.

The metal compound can be a reducible metal compound, which may include a metal oxide. The metal of the metal oxide may have more than one oxidation state.

When the binder is a metal compound, such as a reducible metal compound, then the metal compound can have a D50 particle size from about 10 nm to about 10 µm, from about 10 nm to about 5 µm, from about 10 nm to about 1 µm, from about 15 nm to about 750 nm, or from about 20 nm to about 400 nm.

When the binder is a metal compound, such as a reducible metal compound binder, then the metal compound may be an inorganic salt, an organic salt, or an oxide of a metal. The metal of the inorganic salt, the organic salt or the oxide may be selected from copper, iron, aluminum, chromium, titanium, cobalt, silver, gold, nickel, tin and zinc. In one example the binder is copper nitrate.

Examples of the metal compound when it is an oxide of a metal include a copper oxide (e.g. copper (I) oxide or copper (II) oxide); an iron oxide (e.g. iron(II) oxide or iron(III) oxide); an aluminum oxide; a chromium oxide (e.g. chromium(IV) oxide); a titanium oxide; silver oxide; and zinc oxide, etc. Due to the variable oxidation states of transition metals, they can form various oxides in different oxidation states.

The metal compound can be an inorganic salt or an organic salt of a metal. Examples of inorganic metal salts include a metal bromide, a metal chloride, a metal nitrate, a metal sulfate, a metal nitrite, a metal carbonate, or a combination thereof. Further examples of inorganic metal salts or organic metal salts include chromic acid, chromium sulfate, cobalt sulfate, potassium gold cyanide, potassium silver cyanide, copper cyanide, copper sulfate, nickel carbonate, nickel chloride, nickel fluoride, nickel nitrate, nickel sulfate, potassium hexahydroxy stannate, sodium hexahydroxy stannate, silver cyanide, silver ethanesulfonate, silver nitrate, sodium zincate, stannous chloride (or tin(II) chloride), stannous sulfate (or tin(II) sulfate), zinc chloride, zinc cyanide, tin methanesulfonate.

In some instances, the reducible metal compound can be in the form of a nanoparticle. In other instances, the reducible metal compound can be disassociated or dissolved in the liquid vehicle described hereinafter, such as an aqueous liquid vehicle. Examples include copper nitrate or copper chloride.

The metal compound can be reducible by a reducing atmosphere (e.g. an atmosphere with a reducing agent) and/or can be thermally activated.

The reducible metal compound may be a compound that can be reduced by hydrogen, such as hydrogen released from a thermally activated reducing agent.

When a thermally activated reducing agent is used, it may be sensitive to elevated temperatures. Examples of thermally activated reducing agents include hydrogen ($H_2$), lithium aluminum hydride, sodium borohydride, a borane (e.g., diborane, catecholborane), sodium hydrosulfite, hydrazine, a hindered amine, 2-pyrrolidone, ascorbic acid, a reducing sugar (e.g. a monosaccharide), diisobutylaluminium hydride, formic acid, formaldehyde, or mixtures thereof. The choice of reducing agent can be such that it is thermally activated at a temperature, or can be introduced at a temperature, where reduction of the metal compound may be desired. By way of example, if considering using a metal oxide nanoparticle as the reducible metal compound, there may be metal oxides that are stable (or relatively unreactive) at room temperature, but upon application of heat, e.g. 200° C. to 1000° C. or 250° C. to 1000° C. or from 300° C. to 700° C., a redox-reaction can result in the production of the pure metal or metal alloy. As an example, mercury oxide or silver oxide can be reduced to their respective elemental metal by heating to about 300° C., but the presence of a reducing agent may allow the reaction to occur at a lower temperature, e.g., about 180° C. to 200° C. Oxides of more reactive metals like zinc, iron, copper, nickel, tin, or lead may likewise be reduced simply in the presence of a reducing agent, so the reducing agent can be introduced into the fusing oven or furnace at a time where binding properties may be beneficial. Reducing agents, whether thermally activated or which are reactive without added temperature can be capable of providing hydrogen moieties completing the redox-reaction at elevated temperatures in accordance with examples of the present disclosure.

The binder can be a polymeric binder, such as a latex binder or a polyurethane binder, as described in greater detail hereinafter.

The polymeric binder may be a particulate polymeric binder, such as latex particles.

In general, the particle size of particles of the polymeric binder can be from about 10 nm to about 400 nm. In an example, the particle size of the polymeric binder can be from about 10 nm to about 300 nm, from about 50 nm to about 250 nm, from about 100 nm to about 300 nm, or from about 25 nm to about 250 nm.

The polymeric binder may include at least two polymers having different morphologies. In one example, the polymeric binder has a uniform composition, which may include a single polymer or monomer mixture or may include two different compositions, such as a plurality of monomer compositions, a plurality of polymer or copolymer compositions, or a combination thereof. These may be fully separated core-shell polymers, partially occluded mixtures, or intimately comingled as a polymer solution. In another example, the polymeric binder can be individual spherical particles containing polymer compositions of hydrophilic (e.g. hard) component(s) and/or hydrophobic (e.g. soft) component(s). For example, a core-shell polymer can include a hydrophilic shell with a hydrophobic core or a hydrophobic shell with a hydrophilic core.

In some examples, the polymeric binder can include latex particles.

The latex particles can include polymerized monomers of vinyl, vinyl chloride, vinylidene chloride, vinyl ester, functional vinyl monomers, acrylate, acrylic, acrylic acid, hydroxyethyl acrylate, methacrylate, methacrylic acid, styrene, substituted methyl styrenes, ethylene, maleate esters, fumarate esters, itaconate esters, α-methyl styrene, p-methyl styrene, methyl (meth)acrylate, hexyl acrylate, hexyl (meth)acrylate, butyl acrylate, butyl (meth)acrylate, ethyl acrylate, ethyl (meth)acrylate, propyl acrylate, propyl (meth)acrylate, 2-ethylhexyl acrylate, 2-ethylhexyl (meth)acrylate, isodecyl (meth) acrylate, octadecyl acrylate, octadecyl (meth)acrylate, stearyl (meth)acrylate, vinylbenzyl chloride, isobornyl acrylate, isobornyl (meth)acrylate, tetrahydrofurfuryl acrylate, tetrahydrofurfuryl (meth)acrylate, 2-phenoxyethyl (meth)acrylate, benzyl (meth)acrylate, benzyl acrylate, ethoxylated nonyl phenol (meth)acrylate, isobornyl (meth) acrylate, cyclohexyl (meth)acrylate, trimethyl cyclohexyl (meth)acrylate, t-butyl (meth)acrylate, n-octyl (meth)acrylate, lauryl (meth)acrylate, tridecyl (meth)acrylate, alkoxylated tetrahydrofurfuryl acrylate, alkoxylated tetrahydrofurfuryl (meth)acrylate, isodecyl acrylate, isobornyl methacrylate, isobornyl acrylate, dimethyl maleate, dioctyl maleate, acetoacetoxyethyl (meth)acrylate, diacetone acrylamide, diacetone (meth)acrylamide, N-vinyl imidazole, N-vinylcarbazole, N-vinyl-caprolactam, or combinations thereof, derivatives thereof, or mixtures thereof. These monomers include low glass transition temperature ($T_g$) monomers that can be used to form the hydrophobic component of a heteropolymer.

In an example, the latex particles may include acidic monomers or polymerized acid monomers. The acidic monomers can be used to form the hydrophilic component of a heteropolymer.

Examples of acidic monomers include acrylic acid, methacrylic acid, ethacrylic acid, dimethylacrylic acid, maleic anhydride, maleic acid, vinylsulfonate, cyanoacrylic acid, vinylacetic acid, allylacetic acid, ethylidineacetic acid, propylidineacetic acid, crotonoic acid, fumaric acid, itaconic acid, sorbic acid, angelic acid, cinnamic acid, styrylacrylic acid, citraconic acid, glutaconic acid, aconitic acid, phenylacrylic acid, acryloxypropionic acid, aconitic acid, phenylacrylic acid, acryloxypropionic acid, vinylbenzoic acid, N-vinylsuccinamidic acid, mesaconic acid, methacroytalanine, acryloylhydroxyglycine, sulfoethyl methacrylic acid, sulfopropyl acrylic acid, styrene sulfonic acid, sulfoethylacrylic acid, 2-methacryloyloxymethane-1-sulfonic acid, 3-methacryoyloxypropane-1-sulfonic acid, 3-(vinyloxy)propane-1-sulfonic acid, ethylenesulfonic acid, vinyl sulfuric acid, 4-vinylphenyl sulfuric acid, ethylene phosphonic acid, vinyl phosphoric acid, vinyl benzoic acid, 2-acrylamido-2-methyl-1-propanesulfonic acid, sodium 1-allyloxy-2-hydroxypropane sulfonate, combinations thereof, derivatives thereof, or mixtures thereof.

The acidic monomer content can be from about 0.1 wt % to about 15 wt %, from about 0.5 wt % to about 12 wt %, or from about 1 wt % to about 10 wt % of the latex particles. The remainder of the latex particle may be composed of non-acidic monomers.

In some examples, the acid monomer can be concentrated towards an outer surface of a latex particle.

In one example, the polymer in the latex particles can have a weight average molecular weight ranging from about 10,000 Mw to about 500,000 Mw, from about 100,000 Mw to about 500,000 Mw, or from about 150,000 Mw to about 300,000 Mw.

In some examples, the latex particle can have a glass transition temperature that can range from about range from about −20° C. to about 130° C., from about 60° C. to about 105° C., or from about 10° C. to about 110° C.

The latex particles can have a particle size that can be jetted via thermal ejection or printing, piezoelectric ejection or printing, drop-on-demand ejection or printing, continuous ejection or printing.

The latex particles may include 2, 3, 4 or more relatively large polymer particles that can be attached to one another or can surround a smaller polymer core. In a further example, the latex particles can have a single-phase morphology that can be partially occluded, can be multiple-lobed, or can include any combination of any of the morphologies disclosed herein.

In some examples, the latex particles can be produced by emulsion polymerization.

The shaping composition may include a liquid vehicle. The liquid vehicle may be an aqueous liquid vehicle.

The liquid vehicle can be present in the shaping composition at from about 10 wt % to about 70 wt %, from about 15 wt % to about 60 wt %, from about 20 wt % to about 50 wt %, or from about 25 wt % to about 50 wt %.

In one example, the shaping composition has a viscosity from about 500 to about 800 cps, from about 800 cps to about 2000 cps, or from about 2000 cps to 5 about 5000 cps. These more viscous shaping compositions can be applied by a mechanical applicator, such as a roller, a hard tool such as a spackle applicator or a blade, a blade coater, or a Meyer rod coater.

In another example, the shaping composition has a viscosity from about 50 cps to about 250 cps, from about 50 cps to about 100 cps, or from about 100 cps to about 500 cps. With less viscous shaping compositions, sprayers, jetting architecture, dip coaters, curtain coaters, or brushes, or the like can be used to apply the shaping compositions.

In one example, the shaping composition can be formulated to be a viscous slurry having a viscosity from about 50 cps to about 5000 cps.

The coating thickness for the shaping composition may, for example, be from about ½ mm to about 10 mm, from about 1 mm to about 8 mm, or from about 2 mm to about 5 mm.

As mentioned, in addition to the binder, the shaping composition can also include a liquid vehicle. For example, a blend of the metallic mixture and the binder can be added to a liquid vehicle, or the liquid vehicle can be included with the metallic mixture and binder as a fluid composition, such as a paste or slurry.

The liquid vehicle can be included in an amount from about 10 wt % to about 70 wt %, from about 15 wt % to about 60 wt %, from about 20 wt % to about 50 wt %, or from about 25 wt % to about 50 wt %. Other percentages of the liquid vehicle, such as water or water and other liquid components, can be used, depending on how the shaping composition is to be applied, such as dipping or spraying, may include more liquid vehicle, whereas spreading of a more viscous composition may include less liquid vehicle component.

The liquid vehicle can be an organic or non-aqueous liquid vehicle, which may include no water or concentrations of water of up to 5 wt %.

Alternatively, the liquid vehicle can be an aqueous liquid vehicle. The aqueous liquid vehicle may be water.

In some instances, the liquid vehicle can also include organic co-solvent, a surfactant, a biocide and/or a fungicide.

The aqueous liquid vehicle may include, apart from water, an organic co-solvent, such as a high-boiling solvent and/or humectant. Examples of organic co-solvents include an aliphatic alcohol, an aromatic alcohol, an alkyl diol, a glycol ether, a polyglycol ether, a 2-pyrrolidinone, a caprolactam, a formamide, or an acetamide. Further examples include 1,2-alcohols, 1,3-alcohols, 1,5-alcohols, ethylene glycol alkyl ethers, propylene glycol alkyl ethers, polyethylene glycol alkyl ethers, N-alkyl caprolactams, unsubstituted caprolactams, substituted formamides, unsubstituted formamides, substituted acetamides, unsubstituted acetamides, and combinations thereof.

Some of water-soluble high-boiling solvents can act as coalescing aids for latex particles.

Examples water-soluble high-boiling solvents include propyleneglycol ethers, dipropyleneglycol monomethyl ether, dipropyleneglycol monopropyl ether, dipropyleneglycol monobutyl ether, tripropyleneglycol monomethyl ether, tripropyleneglycol monobutyl ether, dipropyleneglycol monophenyl ether, 2-pyrrolidinone and 2-methyl-1,3-propanediol.

When the liquid vehicle includes an organic co-solvent, then organic co-solvent may be present in an amount from 0 wt % to about 50 wt % of the liquid vehicle. The organic co-solvent can, for example, be present from about 5 wt % to about 25 wt %, from about 2 wt % to about 20 wt %, or from about 10 wt % to about 30 wt % of the liquid vehicle.

The liquid vehicle may further include from about 0.1 wt % to about 50 wt % of a secondary component. The secondary component may be an additive for inhibiting growth of harmful microorganisms, a viscosity modifier, a pH adjuster, a sequestering agent, a surfactant, or a preservative.

Some examples of an additive for inhibiting the growth of harmful microorganisms include a biocide or a fungicide. Commercially available examples can include ACTICIDE® (Thor GmbH), NUOSEPT® (Troy, Corp.), UCARCIDE™ (Dow), VANCIDE® (R.T. Vanderbilt Co.), PROXEL® (Arch Biocides), and combinations thereof.

In one example, the shaping composition comprises: a liquid carrier present at from 10 wt % to about 70 wt %; and a particulate metallic mixture present at from about 30 wt % to about 90 wt %, the particulate metallic mixture including aluminum or aluminum alloy particulates and secondary metal or metal alloy particulates that are reactive with the aluminum or aluminum alloy particulates upon application of heat. The particulate metallic mixture has an aluminum elemental content to a secondary metal elemental content atomic ratio of about 1:2 to about 2:1. The amounts in wt % are based on a total volume of the shaping composition or the total weight of the shaping composition.

Figure 3:
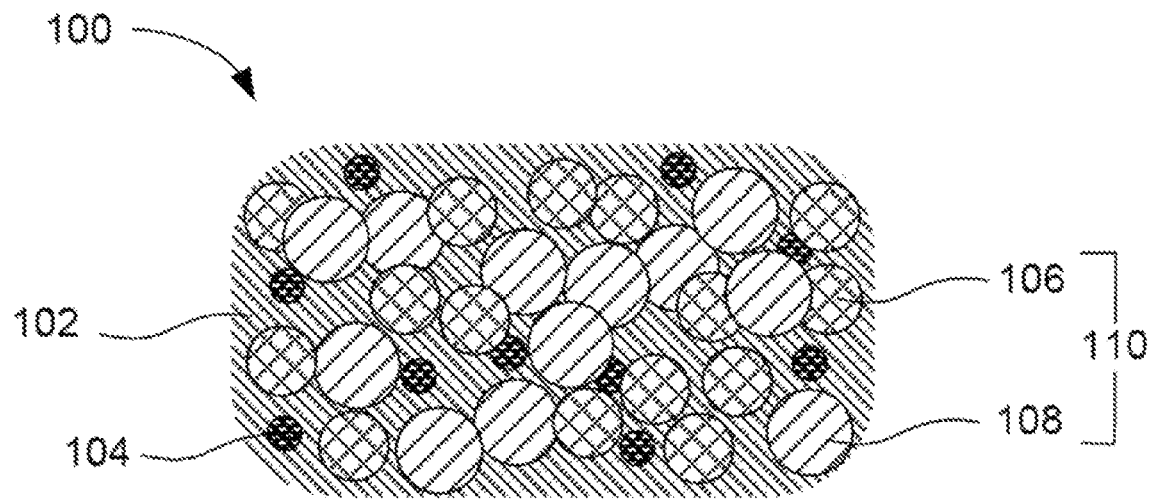
FIG. 3 illustrates an example of a shaping composition in accordance with the present disclosure.

In accordance with examples of the present disclosure, a shaping composition 100 for three-dimensional metal object formation is shown by way of example in FIG. 3. The shaping composition can include a liquid vehicle 102, a binder 104, and a metallic mixture 110. The metallic mixture can include aluminum or aluminum alloy particulates 106 and secondary metal or metal alloy particulates 108.

Figure 4:
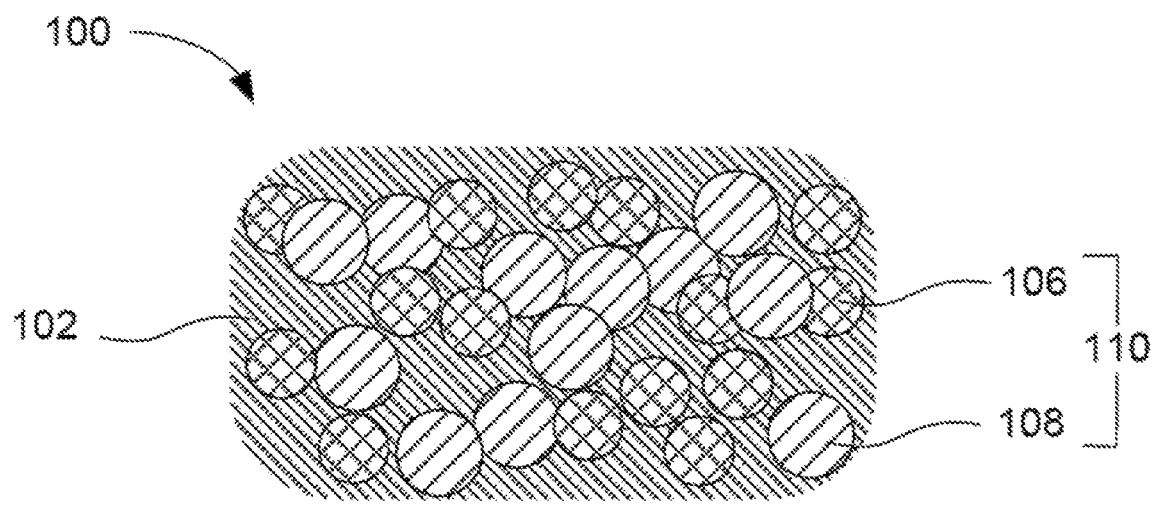
FIG. 4 illustrates an example of a shaping composition in accordance with the present disclosure.

A shaping composition 100 for three-dimensional metal object formation is shown by way of example in FIG. 4. The shaping composition can include a liquid vehicle 102 and a metallic mixture 110. The metallic mixture can include aluminum or aluminum alloy particulates 106 and secondary metal or metal alloy particulates 108.

Build Materials and Metallic Particles

The build material is used to form a metal object having an assembled part. The build material is used to form a green body, which has region for forming the assembled part.

The build material may be a metallic build material.

In general, the build material comprises metallic particles. The build material can include metallic particles of any type that can be fused together at a fusing temperature (above the temperature at which the green body is formed). Fusing can be carried out by sintering, annealing or melting the metal build particles together within the build material.

The metallic particles can be particles of an elemental metal or an alloy.

The metallic particles may include copper, titanium, cobalt, chromium, nickel, vanadium, tungsten, tantalum, molybdenum, iron, stainless steel, steel, or an alloy or mixture thereof.

In another example, the metallic particles are an alloy, such as a steel, an aluminum alloy, a nickel alloy, or a titanium alloy.

In another example, the metallic particles are copper or a copper alloy.

When the metallic particles are a copper alloy or copper-containing metallic particles, the metallic particles may include from 50 wt % to 100 wt % elemental copper, such as, for example, brass or bronze.

The build material can, for example, include from about 80 wt % to 100 wt % of the metallic particles (based on a total weight of the build material).

In an example, the metallic particles can be a single-phase metallic material composed of one element. In this example, fusing, such as by sintering or annealing, can occur at a temperature below the melting point of the element of the single-phase metallic material.

In another example, the build material includes metallic particles comprising two or more elements. The two or more elements can be in the form of a single-phase metallic alloy, e.g. the various particles can be alloys, or a multiple phase metallic alloy, e.g. different particles can include different metals, in the form of composites, e.g., core-shell metallic particles. In these examples, fusing generally can occur over a range of temperatures. With respect to alloys, materials with a metal alloyed to a non-metal (such as a metal-metalloid alloy) can be used as well.

The D50 particle size of the metallic particles can range from about 1 μm to about 150 μm. In some examples, the particles can have a D50 particle size from about 10 μm to about 100 μm, from about 20 μm to about 150 μm, from about 15 μm to about 90 μm, or from about 50 μm to about 150 μm.

The shape of the particles of the build material can be spherical or non-spherical or a combination thereof.

In addition to the metallic particles, the build material may include a binder, as described herein below in the context of the binder for the binder fluid.

When the build material is used in metal injection molding, then the binder may be a polymeric binder.

Binder Fluid

The binder fluid includes a binder. See, for example, the binder fluid used for the additive three-dimensional printing process shown in FIG. 1.

The binder fluid can include a binder carried by a liquid vehicle. The binder fluid is, for example, for jetting from a jetting architecture.

The binder fluid may include binder in an amount of from about 1 wt % to about 30 wt % (by weight based on the build material).

The binder can be co-dispersed with the metallic particles of the build material.

The binder may be a metal compound, such as a reducible metal compound, or a polymeric binder.

The metal compound can be a reducible metal compound, which may include a metal oxide. The metal of the metal oxide may have more than one oxidation state.

When the binder is a metal compound, such as a reducible metal compound, then the metal compound can have a D50 particle size from about 10 nm to about 10 μm, from about 10 nm to about 5 μm, 20 from about 10 nm to about 1 μm, from about 15 nm to about 750 nm, or from about 20 nm to about 400 nm.

When the binder is a metal compound, such as a reducible metal compound binder, then the metal compound may be an inorganic salt, an organic salt, or an oxide of a metal. The metal of the inorganic salt, the organic salt or the oxide may be selected from copper, iron, aluminum, chromium, titanium, cobalt, silver, gold, nickel, tin and zinc. In one example the binder is copper nitrate.

Examples of the metal compound when it is an oxide of a metal include a copper oxide (e.g. copper (I) oxide or copper (II) oxide); an iron oxide (e.g. iron(II) oxide or iron(III) oxide); an aluminum oxide; a chromium oxide (e.g.

chromium(IV) oxide); a titanium oxide; silver oxide; and zinc oxide, etc. Due to the variable oxidation states of transition metals, they can form various oxides in different oxidation states.

The metal compound can be an inorganic salt or an organic salt of a metal. Examples of inorganic metal salts include a metal bromide, a metal chloride, a metal nitrate, a metal sulfate, a metal nitrite, a metal carbonate, or a combination thereof. Further examples of inorganic metal salts or organic metal salts include chromic acid, chromium sulfate, cobalt sulfate, potassium gold cyanide, potassium silver cyanide, copper cyanide, copper sulfate, nickel carbonate, nickel chloride, nickel fluoride, nickel nitrate, nickel sulfate, potassium hexahydroxy stannate, sodium hexahydroxy stannate, silver cyanide, silver ethanesulfonate, silver nitrate, sodium zincate, stannous chloride (or tin(II) chloride), stannous sulfate (or tin(II) sulfate), zinc chloride, zinc cyanide, tin methanesulfonate.

In some instances, the reducible metal compound can be in the form of a nanoparticle. In other instances, the reducible metal compound can be disassociated or dissolved in the liquid vehicle described hereinafter, such as an aqueous liquid vehicle. Examples include copper nitrate or copper chloride.

The metal compound can be reducible by a reducing atmosphere (e.g. an atmosphere with a reducing agent) and/or can be thermally activated.

The reducible metal compound may be a compound that can be reduced by hydrogen, such as hydrogen released from a thermally activated reducing agent.

When a thermally activated reducing agent is used, it may be sensitive to elevated temperatures. Examples of thermally activated reducing agents include hydrogen (Hz), lithium aluminum hydride, sodium borohydride, a borane (e.g., diborane, catecholborane), sodium hydrosulfite, hydrazine, a hindered amine, 2-pyrrolidone, ascorbic acid, a reducing sugar (e.g. a monosaccharide), diisobutylaluminium hydride, formic acid, formaldehyde, or mixtures thereof. The choice of reducing agent can be such that it is thermally activated at a temperature, or can be introduced at a temperature, where reduction of the metal compound may be desired. By way of example, if considering using a metal oxide nanoparticle as the reducible metal compound, there may be metal oxides that are stable (or relatively unreactive) at room temperature, but upon application of heat, e.g. 200° C. to 1000° C. or 250° C. to 1000° C. or from 300° C. to 700° C., a redox-reaction can result in the production of the pure metal or metal alloy. As an example, mercury oxide or silver oxide can be reduced to their respective elemental metal by heating to about 300° C., but the presence of a reducing agent may allow the reaction to occur at a lower temperature, e.g. about 180° C. to 200° C. Oxides of more reactive metals like zinc, iron, copper, nickel, tin, or lead may likewise be reduced simply in the presence of a reducing agent, so the reducing agent can be introduced into the fusing oven or furnace at a time where binding properties may be beneficial. Reducing agents, whether thermally activated or which are reactive without added temperature can be capable of providing hydrogen moieties completing the redox-reaction at elevated temperatures in accordance with examples of the present disclosure.

The binder can be a polymeric binder, such as a latex binder or a polyurethane binder, as described in greater detail hereinafter.

The polymeric binder may be a particulate polymeric binder, such as latex particles.

In general, the particle size of particles of the polymeric binder can be from about 10 nm to about 400 nm. In an example, the particle size of the polymeric binder can be from about 10 nm to about 300 nm, from about 50 nm to about 250 nm, from about 100 nm to about 300 nm, or from about 25 nm to about 250 nm.

The polymeric binder may include at least two polymers having different morphologies. In one example, the polymeric binder has a uniform composition, which may include a single polymer or monomer mixture or may include two different compositions, such as a plurality of monomer compositions, a plurality of polymer or copolymer compositions, or a combination thereof. These may be fully separated core-shell polymers, partially occluded mixtures, or intimately comingled as a polymer solution. In another example, the polymeric binder can be individual spherical particles containing polymer compositions of hydrophilic (e.g. hard) component(s) and/or hydrophobic (e.g. soft) component(s). For example, a core-shell polymer can include a hydrophilic shell with a hydrophobic core or a hydrophobic shell with a hydrophilic core.

In some examples, the polymeric binder can include latex particles.

The latex particles can include polymerized monomers of vinyl, vinyl chloride, vinylidene chloride, vinyl ester, functional vinyl monomers, acrylate, acrylic, acrylic acid, hydroxyethyl acrylate, methacrylate, methacrylic acid, styrene, substituted methyl styrenes, ethylene, maleate esters, fumarate esters, itaconate esters, α-methyl styrene, p-methyl styrene, methyl (meth)acrylate, hexyl acrylate, hexyl (meth) acrylate, butyl acrylate, butyl (meth)acrylate, ethyl acrylate, ethyl (meth)acrylate, propyl acrylate, propyl (meth)acrylate, 2-ethylhexyl acrylate, 2-ethylhexyl (meth)acrylate, isodecyl (meth) acrylate, octadecyl acrylate, octadecyl (meth)acrylate, stearyl (meth)acrylate, vinylbenzyl chloride, isobornyl acrylate, isobornyl (meth)acrylate, tetrahydrofurfuryl acrylate, tetrahydrofurfuryl (meth)acrylate, 2-phenoxyethyl (meth)acrylate, benzyl (meth)acrylate, benzyl acrylate, ethoxylated nonyl phenol (meth)acrylate, isobornyl (meth) acrylate, cyclohexyl (meth)acrylate, trimethyl cyclohexyl (meth)acrylate, t-butyl (meth)acrylate, n-octyl (meth)acrylate, lauryl (meth)acrylate, tridecyl (meth)acrylate, alkoxylated tetrahydrofurfuryl acrylate, alkoxylated tetrahydrofurfuryl (meth)acrylate, isodecyl acrylate, isobornyl methacrylate, isobornyl acrylate, dimethyl maleate, dioctyl maleate, acetoacetoxyethyl (meth)acrylate, diacetone acrylamide, diacetone (meth)acrylamide, N-vinyl imidazole, N-vinylcarbazole, N-vinyl-caprolactam, or combinations thereof, derivatives thereof, or mixtures thereof. These monomers include low glass transition temperature ($T_g$) monomers that can be used to form the hydrophobic component of a heteropolymer.

In an example, the latex particles may include acidic monomers or polymerized acid monomers. The acidic monomers can be used to form the hydrophilic component of a heteropolymer.

Examples of acidic monomers include acrylic acid, methacrylic acid, ethacrylic acid, dimethylacrylic acid, maleic anhydride, maleic acid, vinylsulfonate, cyanoacrylic acid, vinylacetic acid, allylacetic acid, ethylidineacetic acid, propylidineacetic acid, crotonoic acid, fumaric acid, itaconic acid, sorbic acid, angelic acid, cinnamic acid, styrylacrylic acid, citraconic acid, glutaconic acid, aconitic acid, phenylacrylic acid, acryloxypropionic acid, aconitic acid, phenylacrylic acid, acryloxypropionic acid, vinylbenzoic acid, N-vinylsuccinamidic acid, mesaconic acid, methacroytalanine, acryloylhydroxyglycine, sulfoethyl methacrylic acid, sulfopropyl acrylic acid, styrene sulfonic acid, sulfoethylacrylic acid, 2-methacryloyloxymethane-1-sulfonic acid, 3-methacryoyloxypropane-1-sulfonic acid, 3-(vinyloxy)propane-1-sulfonic acid, ethylenesulfonic acid, vinyl sulfuric acid, 4-vinylphenyl sulfuric acid, ethylene phosphonic acid, vinyl phosphoric acid, vinyl benzoic acid, 2-acrylamido-2-methyl-1-propanesulfonic acid, sodium 1-allyloxy-2-hydroxypropane sulfonate, combinations thereof, derivatives thereof, or mixtures thereof.

The acidic monomer content can be from about 0.1 wt % to about 15 wt %, from about 0.5 wt % to about 12 wt %, or from about 1 wt % to about 10 wt % of the latex particles. The remainder of the latex particle may be composed of non-acidic monomers.

In some examples, the acid monomer can be concentrated towards an outer surface of a latex particle.

In one example, the polymer in the latex particles can have a weight average molecular weight ranging from about 10,000 Mw to about 500,000 Mw, from about 100,000 Mw to about 500,000 Mw, or from about 150,000 Mw to about 20 300,000 Mw.

In some examples, the latex particle can have a glass transition temperature that can range from about range from about −20° C. to about 130° C., from about 60° C. to about 105° C., or from about 10° C. to about 110° C.

The latex particles can have a particle size that can be jetted via thermal ejection or printing, piezoelectric ejection or printing, drop-on-demand ejection or printing, continuous ejection or printing.

The latex particles may include 2, 3, or 4 or more relatively large polymer particles that can be attached to one another or can surround a smaller polymer core. In a further example, the latex particles can have a single-phase morphology that can be partially occluded, can be multiple-lobed, or can include any combination of any of the morphologies disclosed herein.

In some examples, the latex particles can be produced by emulsion polymerization.

For metal injection molding, the polymeric binder may be a wax or a polypropylene binder.

In general, the binder fluid may include a liquid vehicle. The binder fluid may include a binder dispersed in the liquid vehicle.

The liquid vehicle can be an organic or non-aqueous liquid vehicle, which may include no water or concentrations of water of up to 5 wt %.

Alternatively, the liquid vehicle can be an aqueous liquid vehicle. The aqueous liquid vehicle may be water.

In some instances, the liquid vehicle can also include organic co-solvent, a surfactant, a biocide and/or a fungicide.

The aqueous liquid vehicle may include, apart from water, an organic co-solvent, such as a high-boiling solvent and/or humectant. Examples of organic co-solvents include an aliphatic alcohol, an aromatic alcohol, an alkyl diol, a glycol ether, a polyglycol ether, a 2-pyrrolidinone, a caprolactam, a formamide, or an acetamide. Further examples include 1,2-alcohols, 1,3-alcohols, 1,5-alcohols, ethylene glycol alkyl ethers, propylene glycol alkyl ethers, polyethylene glycol alkyl ethers, N-alkyl caprolactams, unsubstituted caprolactams, substituted formamides, unsubstituted formamides, substituted acetamides, unsubstituted acetamides, and combinations thereof.

Some of water-soluble high-boiling solvents can act as coalescing aids for latex particles.

Examples water-soluble high-boiling solvents include propyleneglycol ethers, dipropyleneglycol monomethyl ether, dipropyleneglycol monopropyl ether, dipropyleneglycol monobutyl ether, tripropyleneglycol monomethyl ether, tripropyleneglycol monobutyl ether, dipropyleneglycol monophenyl ether, 2-pyrrolidinone and 2-methyl-1,3-propanediol.

When the liquid vehicle includes an organic co-solvent, then organic co-solvent may be present in an amount from 0 wt % to about 50 wt % of the liquid vehicle. The organic co-solvent can, for example, be present from about 5 wt % to about 25 wt %, from about 2 wt % to about 20 wt %, or from about 10 wt % to about 30 wt % of the liquid vehicle.

The liquid vehicle may further include from about 0.1 wt % to about 50 wt % of a secondary component. The secondary component may be an additive for inhibiting growth of harmful microorganisms, a viscosity modifier, a pH adjuster, a sequestering agent, a surfactant, or a preservative.

Some examples of an additive for inhibiting the growth of harmful microorganisms include a biocide or a fungicide. Commercially available examples can include ACTICIDE® (Thor GmbH), NUOSEPT® (Troy, Corp.), UCARCIDE™ (Dow), VANCIDE® (R.T. Vanderbilt Co.), PROXEL® (Arch Biocides), and combinations thereof.

Green Bodies

The green body is used to form a metal objector part of a metal object.

In general, the green body comprises a build material, such as described hereinabove. The build material includes metallic particles. The green body may further include a binder fluid.

The green body can have an initial shape. The initial shape can be a 3D printed shape or a molded shape. The initial shape is the original shape of the green body directly after it has been 3D printed or molded in a metal injection molding process.

In one example, the initial shape is a 3D printed shape.

The initial shape can be converted into a predetermined shape. The predetermined shape is a different shape to the initial shape.

The predetermined shape can be the shape of the metal object having an assembled part or the predetermined shape may be a component part of the metal object having an assembled part. The original shape of the green body is transformed or converted into the predetermined shape.

The initial shape can be arranged to transform or self-assemble into a predetermined shape. This transformation or self-assembly is predictable.

The transformation or self-assembly to the predetermined shape can occur during fusing after the shaping composition has been selectively applied onto a surface of the green body.

The green body, or the initial shape of the green body, may have a region or a plurality of regions for forming an assembled part of the metal object. Thus, the region is, or the plurality of regions are, arranged to self-assemble into an assembled part of the metal object.

The region or the plurality of regions can, for example, be transformed into an assembled part of the metal object when the shaping composition has been selectively applied onto a surface of the green body, such as at the region or the plurality of regions.

The initial shape, such as the 3D printed shape, can be arranged to cause a predicted transformation to a predetermined shape when a predetermined amount of the shaping composition has been selectively applied onto a surface of the green body, such as at the region or the plurality of regions.

Each region or each region of the plurality of regions may be arranged to curl, bend, fold, elongate or to decrease the size of a hole.

The green body may include a coating of the shaping composition. When the green body includes a coating of the shaping composition that it may be referred to as a "coated green body". The coated green body may include a coating of the shaping composition on a surface at a region or a plurality of regions for forming the assembled part of the metal object.

The term "green body" as used herein is synonymous with the term "green body object". The green body may be an uncoated green body, unless it is clear from the context that a coating is present. The term "green body" refers to an object or a part that includes the build material, specifically unfused metallic particles and it may also include a binder, in the form of a three-dimensional shape.

The green body has not been heat-fused, e.g. it has not been sintered or annealed, such as to fuse the metallic particles together.

Green bodies, such as those prepared using three-dimensional printing or other additive manufacturing, can be fused using, for example, heat to form fused metal objects. However, after forming the green body, there is an opportunity for additional shaping to take place prior to fusing the green body into the metal object.

As a green body, the particulate build material can be (weakly) bound together by a binder fluid. Generally, a mechanical strength of the green body is such that the green body can be handled or extracted from a build platform to place in a fusing oven. It is to be understood that any particulate build material that is not patterned with the binder fluid is not considered to be part of the green body, even if the particulate build material is adjacent to or surrounds the green body. For example, unprinted particulate build material can act to support the green body while contained therein, but the particulate build material is not part of the green body unless the particulate build material is printed with binder fluid, or some other fluid that is used to generate a solidified part prior to fusing, e.g., sintering, annealing, melting, etc. Furthermore, green bodies tend to be somewhat fragile with rigidity lower than the metal object that is to be ultimately formed upon heat-fusing the green body. Once the green body is fused, the part or body object can be referred to as a brown object, or more simply herein, as a "metal object" or a "fused metal object."

The metal object having an assembled part may be formed from (a) a plurality of green bodies, such as a first green body and a second green body or (b) a green body and a component part of the metal object, such as a separate component part of the metal objection. The assembled part may have an interlocking arrangement between at least two green bodies of the plurality of green bodies or between the green body and the component part of the metal object.

The interlocking arrangement may, for example, be a chain link or a joint of the metal object, such as between (a) a first part of the metal object formed from the first green body and a second part of the metal object formed from the second green body or (b) a part formed from a green body and the component part of the metal object. The joint can, for example, effect linear or rotational displacement of a first part of the metal object relative to a second part of the metal object.

A first green body and either a second green body or the component part of the metal object may be arranged to enable the transformation or self-assembly from the initial shape, such as the 3D printed shape, to the predetermined shape.

The predetermined shape may be formed from a plurality of green bodies, such as a first green body and a second green body, or from the green body and the component part of the metal object.

A first green body and a second green body can each have an initial shape arranged to transform or self-assemble in combination into an assembled part of the metal object. The initial shape of the first green body may be the same or different to the initial shape of the second green body.

The first green body and the second green body may be arranged, such that when they are each transformed into their predetermined shape they form an assembled part of the metal object. The first green body and the second green body may be spatially arranged, such that at least one of, or both, a region of the first green body and a region of the second green body can form an interlocking arrangement.

The component part of the metal object may not be a green body and is not arranged to transform or self-assemble into a predetermined shape. The component part of the metal object may have a fixed shape.

The initial shape of the green body may be the same or different to the shape of the component part of the metal object.

The green body and the component part of the metal object may be arranged, such that when the green body is transformed into the predetermined shape it forms an assembled part with the component part of the metal object. The green body and the component part of the metal object may be spatially arranged, such that a region of the green body can form an interlocking arrangement with the component part of the metal object.

Three-Dimensional Printing Method

The present disclosure relates to a method of forming a metal object having an assembled part. This method may be a method of three-dimensional printing, specifically a method of three-dimensional printing a metal object having an assembled part.

The method comprises selectively applying a shaping composition onto a surface of a green body at a region for forming the assembled part to produce a coated green body. Each of the shaping composition and the coated green body is as described herein.

The green body can have an initial shape, such as a 3D printed shape, which can be converted into a predetermined shape. The selective application of the shaping composition is to transform or self-assemble the green body into the predetermined shape.

The shaping composition is selectively applied onto a surface of the green body at a region. The region can be arranged to transform or self-assemble into the predetermined shape. The region may be arranged to transform or self-assemble into the predetermined shape by having a precursor shape or structure that can be transformed by, for example, surface expansion into the predetermined shape using the shaping composition.

The selective application of the shaping composition may include applying the shaping composition in a predetermined pattern and/or applying the shaping composition in a predetermined amount.

In one example, the shaping composition is selectively applied onto a surface of the green body at a region to expand the surface at the region to form the assembled part of the metal object. The expansion is brought about by the formation of an intermetallic compound and/or exothermic reaction of the metallic mixture of the shaping composition.

Before the selective application of the shaping composition, the method may include preparing a green body, such as described herein, by 3D printing or by metal injection molding.

In one example, the method includes preparing a green body by 3D printing. Thus, the green body has a 3D printed shape.

The green body can, for example, be 3D printed by forming a layer of the build material, and then selectively applying a binder fluid to the layer of the build material to form a layer of the green body, specifically a layer of the 3D printed shape. The binder fluid may be selectively applied according to a 3D object model or a computer model. The layers may be built up and bound together to form the green body, specifically the 3D printed shape.

In general, the method includes heating the shaping composition to form an intermetallic compound with the metallic particles and/or to exothermically react the metallic mixture. The heating forms the assembled part. The shaping composition is heated after it has been selectively applied onto the green body to produce a coated green body.

The coated green body is also heated to fuse the metallic particles of the build material.

As used herein, the terms "fuse", "fused", "fusing" or the like refers to metallic particles of a green body that have become heat-joined at high temperatures, e.g. from about 500° C. to about 3,500° C., from about 600° C. to about 3,000° C., from about 700° C. to about 2,500° C., or from about 800° C. to about 2,000° C., such as from about 600° C. to about 1,500° C. At such high temperatures the metallic particles are fused together to form a metal object. In some examples, the temperature can range from about 600° C. to about 1,200° C., from about 800° C. to about 1,200° C., or from about 750° C. to about 1,500° C. Thus, fusing refers to the joining of the material of adjacent particles of a particulate build material, such as by sintering, annealing or melting. The joining of the material of adjacent particles can include a complete fusing of adjacent particles into a common structure, e.g. melting together, or can include surface fusing, such as where particles are not fully melted to a point of liquefaction, but individual particles of the particulate build material can become bound to one another, e.g. forming material bridges between particles at or near a point of contact.

The term "fusing" can include metallic particles becoming melted together as a unitary solid mass, or it can include surfaces of metallic particles becoming softened or melted to join together at particle interfaces. In either case, the metallic particles become joined and the fused metal object can be handled and/or used as a rigid part or object without the fragility of the green body.

Sintering of metallic particles of the build material is one form of fusing. Thus, the metallic particles of the build material may be sintered.

The terms "sinter", "sintered", "sintering" or the like refers to the consolidation and physical bonding of the metallic particles together (e.g. after temporary binding using the binder fluid), such as by solid-state diffusion bonding, partial melting of metallic particles, or a combination of solid-state diffusion bonding and partial melting.

Annealing is another form of fusing. Thus, the metallic particles of the build material may be annealed.

The term "anneal" refers to a heating and cooling sequence that controls the cooling process, e.g. slowing cooling to reduce or remove internal stresses and/or toughen the fused metal object (or brown object).

The term "fusing" may also include melting the metallic particles of the build material together to form a unitary mass.

If fusing the metallic particles using sintering, the sintering temperature range can vary, depending on the material.

In one example, the sintering temperature can range from about 10° C. below the melting temperature of the metallic particles of the build material to about 60° C. below the melting temperature of the metallic particles of the build material.

An example of a sintering temperature range for aluminum may be about 600° C. to about 650° C., and an example of a sintering temperature range for copper may be from about 1,023° C. to about 1,073° C.

In one example, a sintering temperature can be used during a heat soak period to sinter and/or fuse the metallic particles to form the metal object.

Heat soaking times for sintering can be from about 5 minutes to about 2 hours, from about 10 minutes to about an hour, or from about 15 minutes to about 45 minutes.

The coated green body may be heated in a fusing oven. When heating the coated green body, the temperature within the fusing oven can be raised from an initial temperature ($T_0$) to an intermediate temperature ($T_{int}$) to a fusing temperature ($T_{fuse}$) to fuse the metallic particles. The increase in temperature from $T_0$ to $T_{int}$ may occur during a heat ramp-up.

As copper has a melting temperature of about 1,080° C., a temperature of 1,030° C. may be used for sintering the metallic particles together. An intermediate temperature ($T_{int}$) of 1,000° C. can, for example, be used for sintering metallic particles including copper.

In the heat-fusing oven, a green body can experience a ramp-up of temperature through intermediate temperature ($T_{int}$) up to a fusing temperature ($T_{fuse}$). When the green body is a copper green body, then the fusing temperature can be within a sintering temperature range for copper, such as about 1,030° C.

The selective application of the shaping composition can be used to change the shape of the green body. By applying a coating of a shaping composition to an upper surface of the green body, the shape can be changed.

After heating, the shaping composition can become an intermetallic reaction product. This reaction product is no longer a viscous slurry due to evaporation of the liquid vehicle during the application of heat. Thus, the residual material from the coating can form a soft metallic powder that can be brushed from the surface of the metal object, with the liquid having been evaporated therefrom during heating.

The heating of the coated green body may produce a reaction product from the shaping composition.

In general, after heating, the method may include removing the reaction product from a surface of the metal object. The reaction product may, for example, be removed by wiping or brushing the surface of the metal object.

The method may be used for the three-dimensional printing of a metal object having an assembled part, where the metal object having an assembled part is formed from (a) a plurality of green bodies, such as a first green body and a second green body or (b) a green body and a component part of the metal object, such as a separate component part of the metal objection. As mentioned above, the assembled part may have an interlocking arrangement between at least two green bodies of the plurality of green bodies or between the green body and the component part of the metal object.

The method may include selectively applying a shaping composition onto a surface of a first green body at a region for forming the assembled part to produce a first coated green body.

The first coated green body or the first green body (i.e. before the shaping composition has been applied onto a surface of the green body) and a second green body may be arranged to enable the transformation or self-assembly from the initial to the predetermined shape. The first coated green body or the first green body and the second coated green body may be spatially arranged to enable the transformation or the self-assembly.

The first coated green body or the first green body and the second green body may be spatially arranged, such that an interlocking arrangement can be formed therebetween.

The first green body and the second green body is each, independently a green body as described herein above.

The method may include selectively applying a shaping composition onto a surface of a second green body at a region for forming the assembled part to produce a second coated green body. The shaping composition may be selectively applied onto a surface of the second green body before, after or at the same time as the shaping composition is selectively applied onto a surface of the first green body.

The first green body and the second green body is each, independently a coated green body as described herein above.

The first coated green body and the second coated green body may be arranged to enable the transformation or self-assembly from the initial shape to the predetermined shape, such as to form an assembled part of the metal object. The first coated green body and the second coated green body may be spatially arranged to enable the transformation or the self-assembly.

The first coated green body and the second coated green body may be spatially arranged, such that an interlocking arrangement can be formed therebetween.

When there is a first coated green body and/or a second coated green body, the method includes heating the shaping composition to react the metallic mixture to form the assembled part. The reaction of the metallic mixture may be a reaction between the first metal and the second metal of the metallic mixture and/or a reaction between a metal of the metallic mixture and a metal of the metallic particles to form an intermetallic compound.

Each coated green body is also heated to react the metallic mixture of the shaping composition and to fuse the metallic particles of the build material.

When the metal object having an assembled part is formed from a green body and a component part of the metal object, then the component part of the metal object may not be a green body and it is not arranged to transform or self-assemble into a predetermined shape. The component part of the metal object may have a fixed shape.

The initial shape of the green body may be the same or different to the shape of the component part of the metal object.

The coated green body or the green body (i.e. before the shaping composition has been applied onto a surface of the green body) and the component part of the metal object may be arranged to enable the transformation or self-assembly from the initial shape to the predetermined shape. The coated green body or the green body and the component part of the metal object may be spatially arranged to enable the transformation or the self-assembly.

The green body and the component part of the metal object may be spatially arranged, such that an interlocking arrangement can be formed therebetween.

When there is a coated green body and a component part of the metal object, the method includes heating the shaping composition to react the metallic mixture to form the assembled part. The component part of the metal object may be heated with the first coated green body.

As above, the coated green body is also heated to exothermically react the metallic mixture of the shaping composition and to fuse the metallic particles of the build material.

Kits and Systems

The present disclosure relates to a kit for forming a metal object, such as a kit for three-dimensional printing (i.e. a three-dimensional printing kit).

The kit includes a build material comprising metallic particles, as described herein above. The kit can include a supply of the build material.

The kit may further include a shaping composition comprising a metallic mixture that is exothermically reactive, as described herein above. The kit can include a supply of the build material.

The kit may further include a binder fluid as described herein above. The binder fluid is for the build material. The kit can include a supply of the binder fluid.

The kit can, for example, include a non-transitory computer readable medium having stored thereon computer executable instructions.

The metal object having an assembled part can be designed by reference to the shape of the metal object. Computer executable instructions loadable from a non-transitory computer readable medium can be used to calculate the first shape in which a green body is printed (e.g. the 3D printed shape) for subsequent transformation to a second shape (e.g. the predetermined shape).

The computer executable instructions may cause a controller of a three-dimensional printing system to: use a build material distributor to dispense the build material to form a green body; and use an applicator to selectively dispense the shaping composition onto a surface of the green body at a region for forming the assembled part.

In one example, the three-dimensional printing kit comprises: a particulate build material comprising about 90 wt % to 100 wt % metallic particles having a D50 particle size from about 1 µm to about 150 µm; and a binder fluid including a binder to apply to particulate build material layers to form a green body; and a shaping composition including a metallic mixture, the shaping composition to apply to a surface of the green body to form an assembled part of a metal object, such as described herein.

In another example, the three-dimensional printing kit can include a build material including about 80 wt % to 100 wt % metallic particles, which may, for example, have a D50 particle size from about 1 µm to about 150 µm, a binder fluid to apply to particulate build material layers to form a green body, and a shaping composition. For example, the shaping composition can include a metallic mixture to apply to a surface of the green body to form an assembled part of a metal object, such as described herein. The shaping composition can include a metallic mixture of aluminum or aluminum alloy particulates and secondary metal or metal alloy particulates.

The present disclosure also relates to a three-dimensional (3D) printing system for printing a metal object having an assembled part. The 3D printing system comprises: a supply of the build material described herein; a build material distributor; a supply of a shaping composition described herein; an applicator for selectively dispensing the shaping composition; a controller; and a non-transitory computer readable medium having stored thereon computer executable instructions to cause the controller to: use the build material distributor to dispense the build material to form a green body; and use the applicator to selectively dispense the shaping composition onto a surface of the green body at a region for forming the assembled part.

The build material distributor may include an applicator for dispensing the build material.

The 3D printing system may further include a binder fluid injector. The 3D printing system may include a supply of binder fluid. This may be coupled to the binder fluid injector.

In general, the computer executable instructions may cause the controller to use the binder fluid distributor to dispense binder fluid to form a green body.

FIG. 1 shows an example of a 3D printing system in accordance with the present disclosure. Build material (200) and binder fluid (210) are loaded in a 3D printing system (300). In this example, the shaping composition 100 is shown next to the 3D printing system in preparation for applying to a green body (220), once the green body has been formed and removed from the build platform (302) and the particulate build material that was not used to form the green body.

The particulate build material can be deposited from an applicator (304) onto the build platform where it can be distributed, such as by being flattened or smoothed, on a layer by layer basis using, for example, a mechanical roller or other flattening technique. A layer of the particulate build material, which includes metallic particles, can be deposited and spread out evenly at the top surface. The layer of powder bed material can be from 5 µm to 400 µm, 25 µm to 400 µm, from 75 µm to 400 µm, from 100 µm to 400 µm, 150 µm to 350 µm, or from 200 µm to 350 µm, for example. The binder fluid can be used to generate the green body on a layer-by-layer basis. Individual layers of particulate build material and previously formed green body layers are shown, but are not to scale.

In this example, the binder fluid may include water and a binder, such as a reducible metal compound, such as copper nitrate, or a polymeric binder, such as a latex particle binder. The binder fluid can be ejected onto the particulate build material from a binder fluid ejector (310) to selectively pattern the particulate build material. The location of the ejected binder fluid onto the particulate build material is controlled to form a layer of the 3D printed shape. Information relating to the location of the binder fluid to print the respective layer can be provided by a 3D object model or computer model. In some examples, a building temperature ($T_{build}$) or heat can be applied when building the green body, e.g. from 50° C. to 200° C. Other examples may not use heat when building the green body. If heat is used, then heat can be provided from a heat source (312) to the various layers (or to the green body after it is formed) to (i) facilitate the binder curing process, and/or (ii) remove solvent from the binder fluid, which can assist with more rapid solidification of individual layers. Removing solvent from the binder fluid can also reduce the wicking period of the binder fluid outside of the printed object boundary and allow for a more precise printed green body.

In one example, heat can be applied from overhead, e.g. prior to application of the next layer of particulate build material, or after multiple layers are formed, etc., and/or can be provided by the build platform from beneath the particulate build material and/or from the particulate build material source (preheating particulate build material prior to dispensing on the build platform or previously applied 3D object layer). As metals can be very good conductors of heat, when applying heat from below, it may be necessary to heat to a temperature that does not decompose the binder. After individual layers are printed with binder fluid, the build platform can be dropped a distance corresponding to a thickness of the applied layer of particulate build material, e.g. about 50 µm to about 200 µm, so that another layer of the particulate build material can be added thereon and printed with the binder fluid, etc. The process can be repeated on a layer by layer basis until a green body is formed that is stable enough to move to an oven suitable for fusing, e.g. sintering, annealing, melting, or the like.

After the green body has been printed into a 3D printed shape, an applicator can selectively dispense the shaping composition onto a surface of the green body. The shaping composition is dispensed onto a region of the green body where it is desired to transform the shape of the green body. The shaping composition will be dispensed in a pattern and in an amount to bring about a desired shape change by, for example, expansion of a surface of the region onto which it is dispensed. Routine experiments can be performed to determine the amount of shaping composition that needs to be applied onto the surface to bring about a desired change in shape.

Definitions

As used herein, any reference to a particle size refers to the diameter of spherical particles or, in particles that are not spherical, refers to the longest dimension of that particle. The particle size can be presented as a distribution, such as a Gaussian distribution or a Gaussian-like distribution (or normal or normal-like distribution). The term "D50" refers to the median particle size (at the 50th percentile). For example, a D50 value of 25 µm means that 50% of the particles (by number) have a particle size greater than 25 µm and 50% of the particles have a particle size less than 25 µm. Particle size measurements can be obtained by Laser Diffraction Particle Size Analysis, such as by using a Malvern Mastersizer 2000.

The term "about" as used herein, when referring to a numerical value or range, allows for a degree of variability in the value or range, for example, within 10%, or, in one aspect within 5%, of a stated value or of a stated limit of a range.

Amounts and other numerical data may be expressed or presented herein in a range format. It is to be understood that such a range format is used merely for convenience and brevity and thus should be interpreted flexibly to include not just the numerical values explicitly recited as the limits of the range, but also to include individual numerical values or sub-ranges encompassed within that range as if each numerical value and sub-range is explicitly recited.

As used in the present disclosure, the term "comprises" has an open meaning, which allows other, unspecified features to be present. This term embraces, but is not limited to, the semi-closed term "consisting essentially of" and the closed term "consisting of". Unless the context indicates otherwise, the term "comprises" may be replaced with either "consisting essentially of" or "consists of".

As used herein, the term "kit" can be synonymous with and understood to include a plurality of compositions including multiple components where the different compositions can be separately contained in the same or multiple containers prior to and during use, e.g. building a 3D object, but these components can be combined together during a build and/or shaping process. The containers can be any type of a vessel, box, or receptacle made of any material.

It is noted that, as used in this specification and the appended claims, the singular forms "a", "an" and "the" include plural referents unless the context clearly dictates otherwise.

EXAMPLES

The present disclosure will now be illustrated by the following non-limiting example.

Example 1—Green Body Sample Preparation

Several green bodies were prepared using a pure copper powder (99% purity) having a D50 particle size of 50 microns as the build material. The green bodies were 3D printed using a three-dimensional printing process similar to that shown in FIG. 1. The binding compound in the binding agent was copper nitrate.

Figure 2:
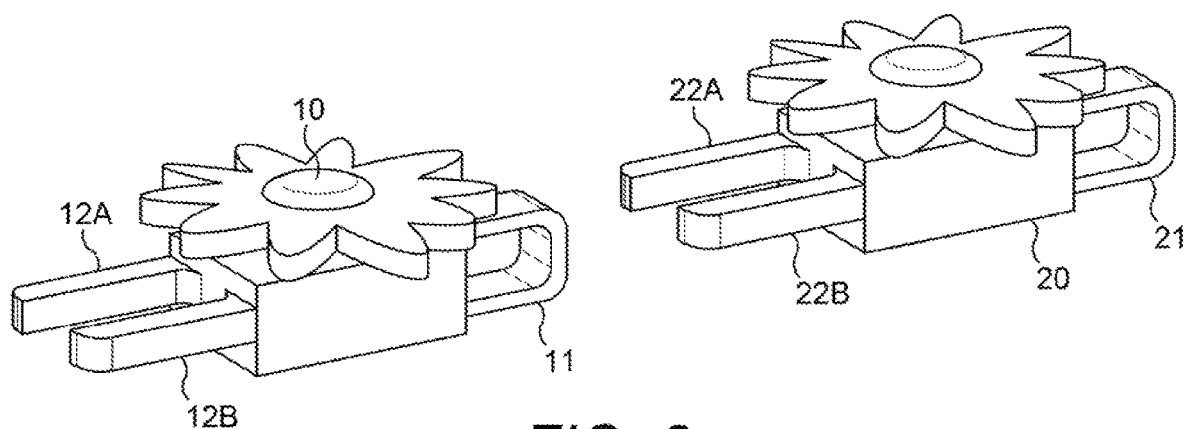
FIG. 2 illustrates an example of a CAD model of the green bodies that can be prepared by 3D printing in accordance with the present disclosure.

FIG. 2 is a CAD model showing, by way of example, the shapes of the green bodies (10 and 20) that were prepared by 3D printing. Each green body has a loop (11, 12) and members (12A, 12B, 22A and 22B) for forming a chain link within the loop.

The green bodies were cured in a layer-by-layer fashion, such as by using a temperature ($T_{build}$) of about at 120 to 160° C. The green bodies were then finally annealed using a temperature at 70 to 100° C. for about 60 to 180 minutes.

Example 2—Preparation of Shaping Compositions

Shaping Composition A

A shaping composition was prepared that includes about 75 wt % of a reactive exothermic metal shaping mixture of stainless steel 316 powder (as the Fe source) and aluminum-silicon alloy (as the aluminum source), about 25 wt % of a latex dispersion that includes a latex binder particle content to provide about 5 wt % latex binder particle content binder, e.g. 20 wt % latex binder particle in the latex dispersion, based on a total weight of the shaping composition. The shaping composition is thus in the form of a thickened slurry. Notably, other levels of binder content and/or metal shaping mixture can be used that may also be sufficient to generate a slurry.

Shaping Composition B

A shaping composition was prepared that includes about 65 wt % of a reactive exothermic metal shaping mixture of stainless steel 316 powder (as the Fe source) and aluminum-silicon alloy (as the aluminum source), about 5 wt % copper nitrate binder, about 10 wt % of aluminum oxide ($Al_2O_3$), and about 20 wt % water, based on a total weight of the shaping composition. The metal shaping mixture was prepared to provide about a 1:1 atomic ratio of iron content from the stainless steel to the aluminum content from the aluminum-silicon alloy. The aluminum oxide was not considered in this 1:1 ratio of iron to aluminum, as it assists with controlling the reaction kinetics rather than participating in the exothermic reaction between the iron and the aluminum.

Though the aluminum oxide was added to dampen or control the reaction rate upon application of heat, e.g. slowing the reaction, the slurry can also be prepared and used without the aluminum oxide.

Likewise, in some examples, the binder can also be omitted if the shaping composition can be coated on the green body object and stay in place sufficiently to cause shaping while the temperature is ramped up through shaping or self-assembly temperatures ($T_{shape}$) up to a fusing temperature ($T_{fuse}$) for the metal build particles that are used.

The shaping composition can be in the form of a viscous slurry that is self-supporting when applied and capable of adhering to green body object surface in any orientation (upward-facing, downward-facing, side-facing, etc.). Other amounts of liquid vehicle (e.g. water), binder and/or aluminum oxide, etc., can be used to generate a shaping composition in the form of a slurry.

Shaping Composition C

A shaping composition was prepared that included equi-atomic proportions of Fe and Al. The composition was prepared from an Al—Si alloy and stainless steel 316 powder. The shaping composition was formulated to generate an exothermic reaction during sintering and to form a Fe—Al intermetallic compound or intermediate intermetallic compounds during the sintering process. The shaping composition included a copper nitrate binder (2 to 5% wt) to make a slurry. As mentioned above, good results can also be obtained without water and the without the inclusion of a binding agent.

Example 3—Method of Self-Assembling a Metal Object

A slurry of shaping composition C from Example 2 above was applied on to the surfaces of the green bodies from Example 1 in regions where self-assembly was required. In this instance, each green body was coated with the shaping composition on members for a forming a link of a chain (see 12A, 12B, 22A and 22B in FIG. 2). The shaping composition was also applied to some of the points of the star shape in each green body. The reason for applying the shaping composition to some of the points of the star shape was to demonstrate the effect of the shaping composition and to create a decorative effect.

The shaping composition was added with 10 wt % of $Al_2O_3$ for controlling or damping the reaction rate and to avoid cracking.

Figure 5:
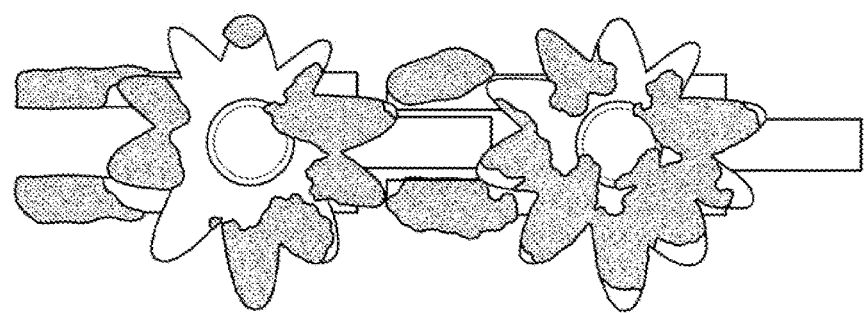
FIG. 5 is an image showing examples of green bodies coated with a shaping composition in accordance with the present disclosure.

The coated green bodies were baked at 70 to 100° C. for up to 30 mins to dry the coating. FIG. 5 shows the coating (e.g. the shaping composition—see the shaded areas) on the green bodies before sintering.

The coated green bodies were placed flat in an alumina crucible or quartz plate for sintering in a furnace. The first green body (10) and the second green body (20) were positioned to ensure that the loop (11) of the first green body was positioned between the members (22A and 22B) of the second green body for forming a chain link.

The coated green bodies were heated and sintered using, as an example, Heating Protocol 1 (see below) under a reducing gas mixture of $Ar/H_2$.

Heating Protocol 1: Heating at 5° C./minute from room temperature to 170° C.→Heating at 2.5° C./min from 170° C. to 300° C.→hold at 300° C. for 2 h→Heating at 2.5° C./min from 300° C. to 500° C.→hold at 500° C. for 2 h→Heating at 2.5° C./min from 500° C. to 650° C.→hold at 650° C. for 1 h→Heating at 2.5° C./min from 650° C. to 1040° C.→hold at 1040° C. for 4 min→Cool in furnace to room temperature.

During sintering, at a temperature of 500° C., the aluminum powder particles sinter together and bond with Cu on the surfaces of the green bodies, which holds each of green bodies together thereby avoiding sagging. As the temperature reached 600° C. and above, the exothermic reaction between the Al and Fe in the shaping composition initiated, which resulted in an expansion of the coatings (composed of the shaping composition) on the green bodies. This expansion induces deformation of the coated regions of each green body.

The heating cycle can be varied to simply heat the green body to a sintering temperature without holding the temperature at various intermediate temperatures.

Figure 6:
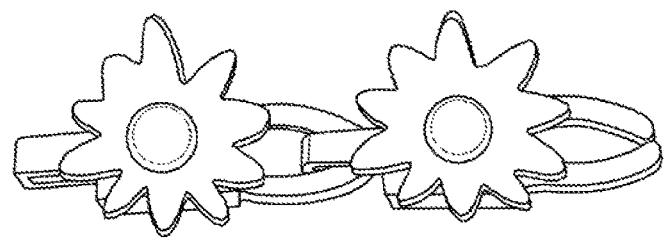
FIG. 6 is an image showing an example of a metal object having a self-assembled part in accordance with the present disclosure.
Figure 6:
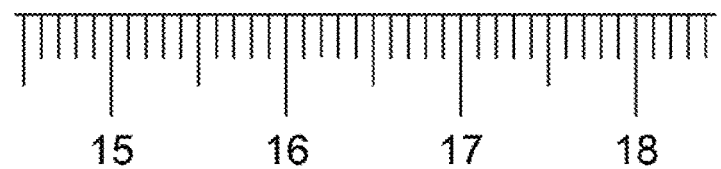
Figure 7:
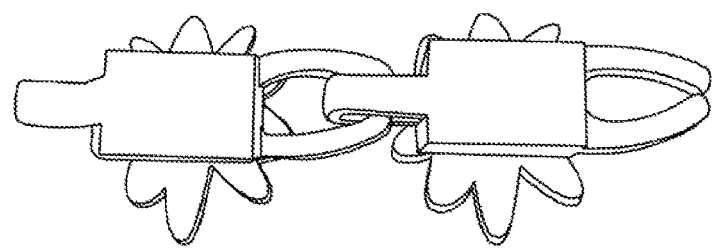
FIG. 7 is an image showing an example of a metal object having a self-assembled part in accordance with the present disclosure.
Figure 7:
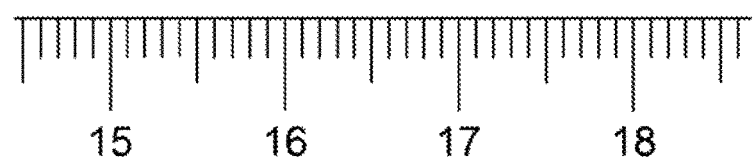

FIGS. 6 and 7 show the final metal object after sintering, which has an assembled part (e.g. a chain link). The self-assembly of the green bodies to form the metal object is due to a process of self-assembly, which is produced by the exothermic reaction of the shaping composition. The shaping composition has undergone reaction and the exothermic heat has caused faster sintering on the surfaces of the green bodies. The expansion of the reaction product (Fe—Al intermetallic compound) in the shaping composition caused a desired deformation of the green bodies during sintering.

The coated points of the stars of the green bodies were also deformed out of the plane. It could be seen that the amount of deformation depended on the amount and composition of the coating (see FIGS. 6 and 7).

After cooling the product after sintering, the by-product of the shaping composition was a super porous black powder, which could be brushed off easily. After removing the black powder by physical wiping, the metal object was sand blasted to improve the surface appearance of the metal object part. The initial members (12A, 12B, 22A and 22B) of the green bodies were closed due to shape deformation and formed interconnected parts (see FIGS. 6 and 7).

An assembly of such parts with such a geometry cannot be produced by 3D printing without placing spacers or provision of supports underneath during sintering treatment in a binder-jet and sinter method. Even in the case of DLMS or other melt and solidification processes, such a shape requires both the presence of supports and additional work to machine off the supports.

The invention claimed is:

1. A coated green body for preparing a metal object having an assembled part, the coated green body comprising:
   a green body having a three-dimensional shape that is defined by metallic particles and a binder; and
   a coating of a shaping composition on a surface of the green body at a region for forming the assembled part of the metal object;
   wherein the shaping composition comprises a metallic mixture for forming an intermetallic compound with the metallic particles or that is exothermically reactive, and wherein the coated green body has an initial shape arranged to self-assemble into a predetermined shape, which is a shape of the metal object.

2. The coated green body of claim 1, wherein the region for forming the assembled part of the metal object is arranged to curl, bend, fold, elongate or to decrease the size of a hole.

3. The coated green body of claim 1, wherein the metallic particles are particles of an alloy selected from the group consisting of a steel, an aluminum alloy, a nickel alloy, and a titanium alloy.

4. The coated green body of claim 1, wherein the metallic particles are selected from the group consisting of copper particles and copper alloy particles.

5. The coated green body of claim 1, wherein the metallic mixture comprises:
   (a) aluminum particulates or aluminum alloy particulates; and
   (b) secondary metal particulates or second metal alloy particulates.

6. The coated green body of claim 1, wherein the binder is copper nitrate.

7. A method of forming a metal object having an assembled part, the method comprising:
   defining a green body having a three-dimensional shape that is defined by metallic particles and a binder;
   selectively applying a shaping composition onto a surface of the green body at a region for forming the assembled part to produce a coated green body having an initial shape arranged to self-assemble into a predetermined shape of the metal object having the assembled part, wherein the shaping composition comprises a metallic mixture for forming an intermetallic compound with the metallic particles or that is exothermically reactive; and
   heating the shaping composition to react the metallic mixture to form the assembled part.

8. The method of claim 7, wherein the metallic particles are selected from the group consisting of copper particles and copper alloy particles, and wherein the metallic mixture is selected from the group consisting of (a) aluminum particulates or aluminum alloy particulates and (b) secondary metal particulates or secondary metal alloy particulates.

9. The method of claim 7, further comprising arranging the coated green body and a second green body to enable the transformation or self-assembly from the initial shape to the predetermined shape.

10. The method of claim 9, wherein the coated green body and the second green body are spatially arranged to form an interlocking arrangement therebetween.

11. The coated green body of claim 1, wherein:
   the metallic particles are particles are selected from the group consisting of copper particles and copper alloy particles; and
   the metallic mixture comprises:
   (a) aluminum particulates or aluminum alloy particulates; and
   (b) secondary metal particulates or second metal alloy particulates.

* * * * *